March 24, 1925.
H. F. FARMER ET AL
MOTOR CONTROL SYSTEM
Filed Aug. 4, 1923
1,530,989
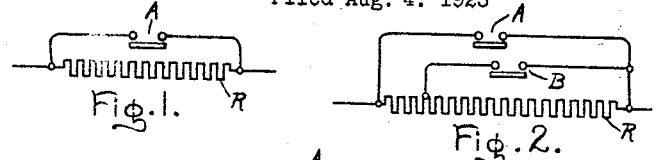
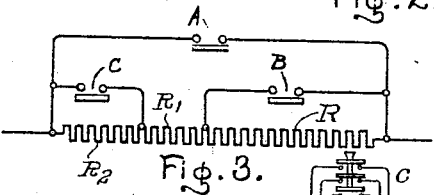
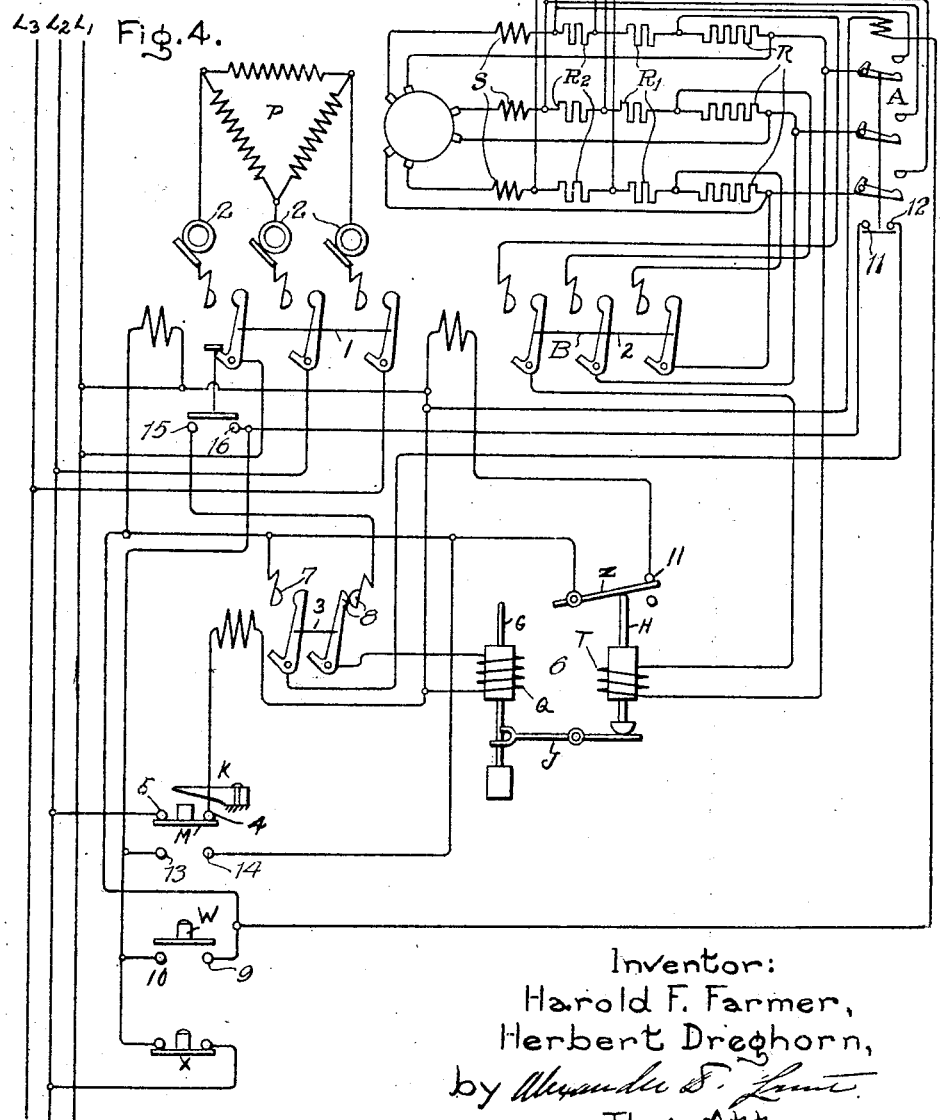
Inventor:
Harold F. Farmer,
Herbert Dreghorn,
by Alexander S. ____
Their Attorney.

Patented Mar. 24, 1925.

1,530,989

UNITED STATES PATENT OFFICE.

HAROLD FITZHUGH FARMER AND HERBERT DREGHORN, OF RUGBY, ENGLAND, ASSIGNORS TO GENERAL ELECTRIC COMPANY, A CORPORATION OF NEW YORK.

MOTOR-CONTROL SYSTEM.

Application filed August 4, 1923. Serial No. 655,756.

*To all whom it may concern:*

Be it known that we, HAROLD FITZHUGH FARMER and HERBERT DREGHORN, subjects of the British Empire, residing at Rugby, in the county of Warwick, England, have invented certain new and useful Improvements in Motor-Control Systems, of which the following is a specification.

This invention relates to systems of electric motor control and more particularly to the control of alternating current commutator motors when used for driving printing presses and similar machines.

On such machines it is necessary to have a large starting torque and as soon as the speed of the machine attains a creeping value it is necessary to retain the speed at this low value. With a variable speed alternating current commutator motor of the type disclosed by United States Reissue Letters Patent of Hidde Klass Schrage No. 14,031, December 14, 1915, the speed variation is obtained by brush control and the creeping speed is obtained by inserting in the secondary circuit a small resistance in each phase with the brushes set to give the lowest speed possible by brush control.

The conditions of a large starting torque and low creeping speed are antagonistic and cannot be obtained by one setting of the resistance, as immediately the motor gets over the starting period the torque falls rapidly. To meet these conditions it is usual to employ a controller having several points and at starting the controller is notched up until enough resistance is cut out to give the necessary current for starting and as soon as the press starts the controller is notched back, reinserting sufficient resistance to obtain the creeping condition. On other types of motors employed for driving printing presses the usual control is by push buttons and therefore the manipulation of a controller does not find favor.

The object of the present invention is to provide means for controlling an alternating current commutator motor by means of push buttons instead of employing a controller, and to that end it consists in providing means responsive to the secondary current for varying the resistance in the secondary circuit. The means for varying the resistance preferably comprises a contactor connected across the resistance and controlled by a current limit relay in the secondary circuit. On pressing the inch button the motor starts up with the contactor closed and the resistance cut out. As the motor speeds up, the secondary current falls and the current limit relay working on the falling current operates to cause the contactor to drop out, thereby inserting the resistance and thus holding the speed at a creeping value. On pressing the start button, which is usually done while still pressing the inch button, the contactor again closes, cutting out the resistance and allowing the motor to run at its lowest speed on brush control, further increase being obtained by moving the brushes.

The accompanying drawings illustrate one method of carrying the invention into effect, Figs. 1, 2 and 3 showing one phase of resistance and corresponding contactors, and Fig. 4 being a diagram of connections suitable for a system embodying the invention.

Referring to Fig. 1, R represents a resistance inserted in each phase of an alternating current commutator motor. A contactor A is connected across the whole of the resistance R and is controlled by means of a current limit relay in the secondary circuit. If the motor has too much starting torque, the acceleration is too rapid and causes the paper to break. This may be avoided by employing a second contactor B, Fig. 2, connected across only part of the resistance R. During inching the contactor B is closed, cutting out part of the resistance, and the current limit relay opens it again, when the current has dropped to a predetermined value. Then on pressing the start button, the contactor A closes and all resistance is cut out.

Many presses are called upon to print papers of different numbers of pages and provision has to be made to meet these cases. It is evident that the resistance in series with the secondary winding gives a series speed characteristic such that a reduction in load causes a creeping speed which is too high for feeding in purposes. This may be guarded against by providing a third contactor C, Fig. 3, connected across a small section of resistance. Then if Fig. 2 represents the contactor system for a press producing a twelve page paper, Fig. 3 might represent the system for producing say a ten page paper. The contactor C is controlled by a selector snap switch, so that when a twelve page paper is required a button is pressed to cause the contactor C to close. When however a ten page paper is required, the load is not so heavy and more resistance is required to get the creeping speed, so that another button is pressed to cause the contactor C to open and insert more resistance.

Further selector push buttons and contactors may be employed to produce a paper of still fewer pages.

A diagram of connections suitable for an equipment embodying the invention is shown in Fig. 4, in which P is the primary winding and S the secondary winding of an alternating current commutator motor. The primary circuit P is controlled by a line contactor 1, which makes the circuit to the primary P through the medium of the usual slip rings 2. The secondary circuit S is connected through three separate resistances R, $R_1$ and $R_2$ and a secondary contactor B, under certain conditions of inching and starting.

A relay contactor 3 is provided for changing the control connections between the one condition required for inching and the other condition required for starting. The contactor 3 is controlled through the medium of a special attachment to the push button used for inching control, the arrangement being such that a shutter K is provided on the push button station, normally covering a button M used for inching control. The button M is provided with contacts 4, 5, for the off position, in order to energize relay contactor 3. When the shutter K is operated to uncover the inching button M for use, the operator depresses the button M a certain amount of its travel, thus opening the normally closed contacts 4, 5 and causing contactor 3 to open.

A current limit relay 6 is adapted to control the secondary contactor B, and may be of any well known form. As shown in Fig. 4, it comprises a system of two plungers G, H connected by a rocking lever J, the system being weight biased to one position. A shunt coil Q is adapted to lift the plunger G and release the mechanical support previously given to the plunger H, which is provided with a series coil T connected in the secondary circuit S. If the shunt coil Q is energized, then the plunger H is free to drop when the magnetic effect due to the current in the series coil T has died down to a predetermined value.

The operation of the system is as follows:

To start up the motor without any inching, the shutter K on the inching button M being in position, the relay contactor 3 will close, the circuit being from line $L_1$ through the coil of contactor 3, contacts 4, 5 on buttons M, to line $L_2$. This closes contact 7 and opens contact 8. The opening of the contact 8 disconnects the shunt coil Q of relay 6, so as to put this relay out of action during the starting operation. On pressing the starting button W, contacts 9, 10 are joined and the circuit for the primary contact 1 is completed from line $L_1$, through the coil of contactor 1, starting button contacts 9, 10, stop button X, to line $L_2$, thus closing the primary contactor 1. At the same time the secondary contactor A is energized, the circuit being from line $L_1$, through the coil of contactor A, start button W, stop button X, to line $L_2$. The secondary contactor A will thus close, completing the starting up of the motor. If the start button be released, thus opening contacts 9, 10, a circuit still exists for retaining contactors 1, A in the closed position, through contact 7 on the relay contactor 3 and contacts 11, 12 on an interlock which is closed when the contactor A closes. The machine will therefore continue to run as long as required.

To shut down, it is only necessary to open the contacts of the stop button X, thus causing contactors 1, A to drop out, when they will remain open until the start button is again pressed.

If it is required to inch the motor, the shutter K is moved to expose the inching button and in so doing the contacts 4, 5 on the inching button M are opened by the operation of the shutter. Contactor 3 now opens, disconnecting the retaining contact 7 previously closed for contactors 1, A and preparing the shunt operating coil Q of relay 6 ready for operation when the inching button M is pressed.

On pressing the inching button M contacts 13, 14 are bridged, thus closing contactor 1, the circuit for closing being from line $L_1$ through the operating coil of contactor 1, contacts 13, 14 on inch button M, stop button X to line $L_2$. At the same time the circuit is completed for the closing of contactor B from line $L_1$, through the operating coil of contactor B, the normally closed contacts 11 on relay 6, inching button contacts 13, 14, stop button X to line $L_2$. Contactors 1, B therefore close, thus applying current to the primary and cutting out resistance R in the secondary to give the necessary torque to start from rest. The closing of contactor B results in current peak in the series coil T of relay 6, which current peak will hold the series plunger H up until the main current has died down to a predetermined value.

When primary contactor 1 has closed, the circuit is completed for energizing the shunt coil Q of relay 6, the circuit being from line $L_1$, through shunt coil Q, contact 8 on contactor 3, interlock contacts 15, 16 on contactor 1, stop button X, to line $L_2$. The shunt plunger G of relay 6 is therefore drawn up, releasing the mechanical support previously given to the series plunger H of the relay, and leaving the plunger H free to drop if the magnetic effect of the current in the secondary circuit S has died down to a predetermined value. When this occurs the series plunger drops, carrying with it the contact arm Z of the relay and opening contact 11. This results in the opening of contactor B, which re-inserts the series resistance R in the secondary circuit S of the motor for the running condition required when inching. On releasing the inch button M, the circuit is broken at contacts 13, 14, thus opening the primary contactor 1 and shutting down the machine.

The cycle of closing contactors 1, B and thereafter opening contactor B under control of current limit relay 6 will be repeated every time the inch button is pressed and this will allow the machine to start from rest, giving a high initial torque to overcome friction, and then to run at the low speed required for feeding in the paper once the machine has started.

What we claim as new and desire to secure by Letters Patent of the United States, is,—

1. A speed control system for an alternating current commutator motor comprising a resistance in the secondary circuit, means for reducing the resistance of the secondary circuit when starting, means responsive to the secondary current for increasing said resistance to hold the speed at a predetermined value, and means for reducing said resistance again to run the motor at its lowest speed on brush control.

2. In a control system for an alternating current commutator motor in which the speed is controlled by varying the resistance in the secondary circuit, means for cutting out part of the resistance when starting, means responsive to the secondary current for re-inserting when the current falls to a predetermined value, the part of the resistance cut out, and means for cutting out all the resistance to run the motor at its lowest speed on brush control.

3. A control system for an alternating current commutator motor comprising a resistance in the secondary circuit, a contactor arranged to short-circuit a part of the resistance when the motor is started, and a relay responsive to the current in the secondary circuit for controlling the said contactor to re-insert the resistance when the current falls to a predetermined value, and a second contactor arranged to short circuit the whole of the resistance to run the motor at its lowest speed on brush control.

4. A system as claimed in claim 3, in which a third contactor is arranged to short circuit a second part of the resistance when the motor is started under one predetermined load, and is adapted to re-insert the second part of the resistance when the motor is started under a second predetermined load which is less than the first predetermined load.

In witness whereof, we have hereunto set our hands this twentieth day of July, 1923.

HAROLD FITZHUGH FARMER.
HERBERT DREGHORN.

Witnesses:
J. A. FOSTER,
DOROTHY WHITE.